(12) United States Patent
Juenemann et al.

(10) Patent No.: US 8,842,260 B2
(45) Date of Patent: Sep. 23, 2014

(54) COMPACT LASER RANGEFINDER

(75) Inventors: Otto Juenemann, Bucha (DE); Uwe Schaller, Kahla (DE); Dieter Schmidt, Gera (DE)

(73) Assignee: ESW GmbH, Wedel (DE)

( * ) Notice: Subject to any disclaimer, the term of this patent is extended or adjusted under 35 U.S.C. 154(b) by 190 days.

(21) Appl. No.: 13/037,702

(22) Filed: Mar. 1, 2011

(65) Prior Publication Data

US 2011/0211188 A1 Sep. 1, 2011

(30) Foreign Application Priority Data

Mar. 1, 2010 (DE) .......................... 10 2010 010 097

(51) Int. Cl.
G01C 3/08 (2006.01)
G01S 7/481 (2006.01)

(52) U.S. Cl.
CPC .................................. G01S 7/4811 (2013.01)
USPC ....... 356/4.01; 356/3.01; 356/4.07; 356/5.01; 356/5.09; 356/9; 356/625

(58) Field of Classification Search
USPC ........................................ 356/4.01, 3.01, 625
See application file for complete search history.

(56) References Cited

U.S. PATENT DOCUMENTS

| | | | |
|---|---|---|---|
| 3,697,762 A | 10/1972 | Kurtz | |
| 5,812,893 A * | 9/1998 | Hikita et al. | 396/106 |
| 6,294,776 B2 * | 9/2001 | Miksch et al. | 250/208.1 |
| 6,972,834 B1 | 12/2005 | Oka et al. | |
| 7,869,004 B2 * | 1/2011 | Gerth et al. | 356/4.01 |
| 2003/0151996 A1 * | 8/2003 | Hendriks et al. | 369/53.2 |
| 2004/0056346 A1 * | 3/2004 | Palm et al. | 257/706 |
| 2005/0230820 A1 * | 10/2005 | Licht | 257/720 |
| 2005/0254745 A1 * | 11/2005 | Schrodinger | 385/14 |
| 2006/0072881 A1 * | 4/2006 | Schunk | 385/92 |
| 2006/0086534 A1 * | 4/2006 | Oggioni et al. | 174/261 |
| 2007/0026730 A1 * | 2/2007 | Kikuchi | 439/552 |
| 2007/0297145 A1 * | 12/2007 | Karrer et al. | 361/720 |
| 2008/0116551 A1 * | 5/2008 | Ferstl et al. | 257/678 |
| 2008/0151515 A1 * | 6/2008 | Das et al. | 361/761 |
| 2008/0241537 A1 * | 10/2008 | Sennett et al. | 428/394 |

FOREIGN PATENT DOCUMENTS

| | | |
|---|---|---|
| DE | 197 18 157 A1 | 11/1998 |
| DE | 101 57 378 A1 | 6/2003 |
| DE | 103 31 074 A1 | 2/2005 |
| DE | 202 21 470 U1 | 4/2006 |
| DE | 10 2005 035 417 A1 | 2/2007 |
| DE | 10 2005 041 998 A1 | 3/2007 |

(Continued)

OTHER PUBLICATIONS

Hoban, Mark J. and Barry M. Lunt. "Soldering". Technology Interface on-line journal (Spring 1997). http://technologyinterface.nmsu.edu/spring97/spring97.html.*

*Primary Examiner* — Luke Ratcliffe
*Assistant Examiner* — Samantha K Abraham
(74) *Attorney, Agent, or Firm* — Duane Morris LLP

(57) ABSTRACT

A laser distance measuring device comprising a transmitter channel (1), a receiver channel (2) and a dimensionally stable multilayer base printed circuit board (3), with the transmitter channel (1) and the receiver channel (2) being mounted and symmetrically disposed one on each side of the base printed circuit board (3), with the base printed circuit board (3) serving as a mechanical foundation, as an optical and electrical shield, as a carrier of electrical and optical connections and, optionally, as a heat conductor.

6 Claims, 1 Drawing Sheet

(56) References Cited

FOREIGN PATENT DOCUMENTS

| EP | 0 718 974 A1 | 6/1996 |
| EP | 0 875 770 A1 | 11/1998 |
| EP | 2 116 867 A2 | 4/2008 |
| JP | 1 124 788 A | 5/1989 |

* cited by examiner

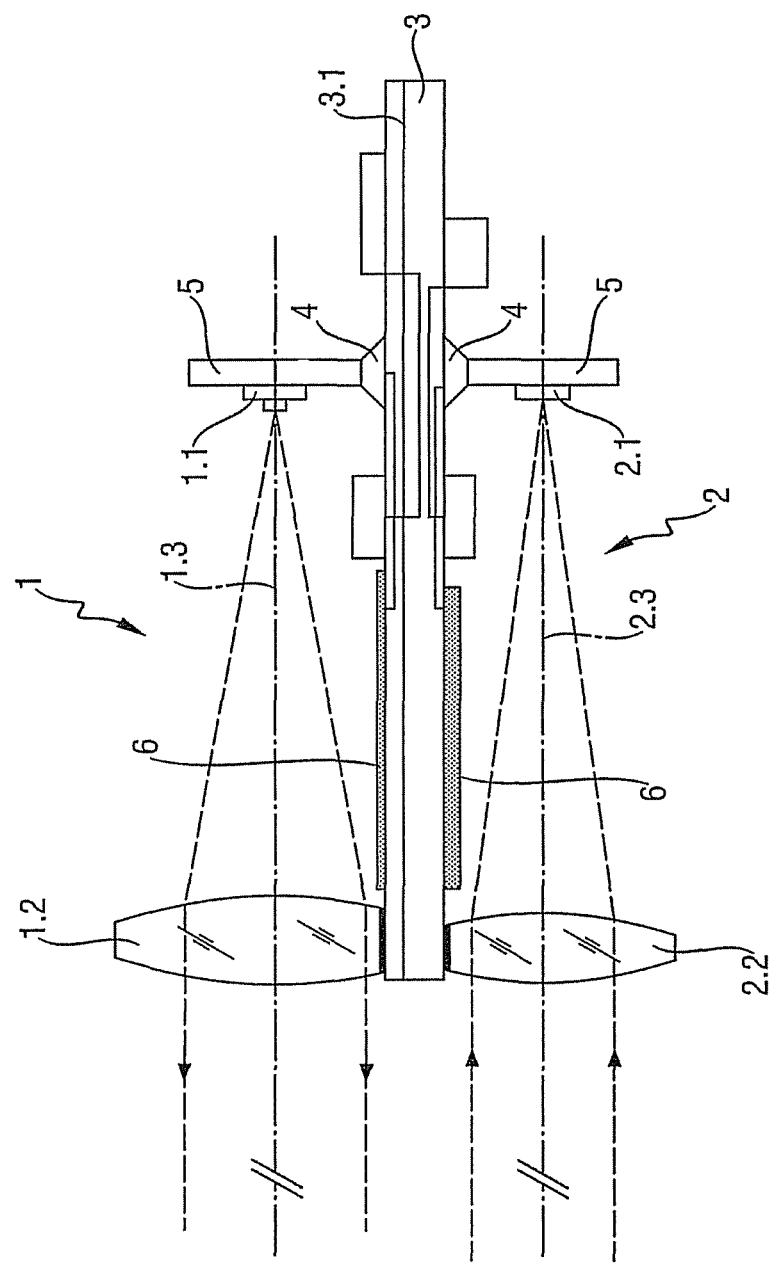

COMPACT LASER RANGEFINDER

RELATED APPLICATIONS

The present application claims priority benefit of German Application No. DE 10 2010 010 097.8 filed on Mar. 1, 2010, the contents of which is incorporated by reference in its entirety.

FIELD OF THE INVENTION

The subject matter of the present invention relates to a laser distance measuring device of the type generically known from DE 103 31 074 A1.

Laser distance measuring devices preferably operate on the principle of pulse time-of-flight measurement. These devices transmit a laser pulse in the direction of a target to be measured, they receive a target-reflected radiated energy fraction of the laser pulse, and they calculate the distance of the target measured from the laser distance measuring device based on the time of flight of the laser pulse and the speed of light.

Laser distance measuring devices of this type essentially comprise a transmitter channel with a transmission axis and a receiver channel with a reception axis, with the transmission axis and the reception axis being aligned parallel to each other.

The transmitter channel comprises, as components, a laser transmitter, e.g., a laser diode, and an optical transmission system, in the focal plane of which the laser transmitter is disposed. The location of the transmission axis which passes through the nodal point of the optical transmission system and the center of the laser transmitter is determined by the position and the alignment of the laser transmitter and the optical transmission system.

The receiver channel comprises, as components, a receiver, e.g., a photodiode, and an optical reception system, in the focal plane of which the receiver is disposed. The location of the reception axis which passes through the nodal point of the optical reception system and the center of the receiver is determined by the position and the alignment of the receiver and the optical reception system.

To deflect the beam, beam-deflecting elements, e.g., mirrors, can be disposed in the channels.

It is obvious to the person skilled in the art that the terms "optical transmission system" and "optical reception system" are meant to include all optical elements of the transmitter channel and the receiver channel that participate in the beam formation. In most cases, the optical elements involved are simply single lenses, but they can also be assemblies of several lenses, in particular so-called cemented lens assemblies.

For the sake of the range and the accuracy of the distance measurement, it is necessary for the transmission axis and the reception axis to be aligned exactly parallel to each other and for this alignment to remain permanently stable, regardless of mechanical and thermal influences. The greater the distances to be measured, the higher are the accuracy requirements.

PRIOR ART

The prior art knows a large number of laser distance measuring devices to which the description above applies and which are therefore deemed to be generically identical to the laser distance measuring device disclosed by the present invention. The disclosure about such laser distance measuring devices, however, is frequently limited to basic configurations only and does not offer information about the actual design by means of which the alignment and stabilization of the two axes are ultimately implemented.

U.S. Pat. No. 5,812,893 discloses a laser distance measuring device with a transmitter and a receiver which are disposed on opposite sides of a flexible printed circuit board from each other and which are directly mounted thereon. The printed circuit board is contained in a housing which serves as carrier for a transmitter lens and a receiver lens and two path-folding mirrors.

Since the transmitter and the receiver are disposed on opposite sides from each other on the opaque printed circuit board, they can be mounted in close proximity to each other, without direct radiation or scattered radiation from the transmitter being able to impinge upon the receiver. This obviates the need for means for shielding the receiver, and the laser distance measuring device can be designed smaller and more compactly. It is not possible to gather from the description in U.S. Pat. No. 5,812,893 how the alignment is accomplished. There is also no mention of measures taken to ensure thermal and mechanical stability.

DE 10 2005 041 998 A1 discloses a laser distance measuring device having an optical system carrier which has means for mounting an optical reception system (in this case, a receiver lens) and guides and fasteners for, respectively, moving and securing in place a printed circuit board on which a laser transmitter (in this case, a transmitter), an optical transmission system (in this case, an optical collimating system) and a receiver are pre-mounted. After the receiver lens has been inserted into the mounting means, the printed circuit board is moved in the z-direction within the optical system carrier until the receiver comes to be located approximately in the focal point of the receiver lens, and the printed circuit is subsequently secured in place.

Subsequently, the receiver lens is laterally moved in the direction of the x- and y-axis until the reception axis, at a certain distance from the distance measuring device, faces the center of the transmission axis of the biaxial system, and the receiver lens is subsequently secured in place in the mounting means, e.g., by means of an adhesive.

Thus, the transmission axis and the reception axis are aligned parallel to each other.

By mounting the electronic components and the electro-optical components, i.e., the transmitter and the receiver, on a printed circuit board, it is possible to route the electrical connections between the components in the form of conductor tracks within or on the printed circuit board. All of the components should preferably be mounted on one side of the printed circuit board, so that they are disposed in a protected position between the printed circuit board and the optical system carrier.

The optical system carrier with the mounted and aligned printed circuit board and the aligned optical imaging system can now be inserted into a housing of a measuring device.

Since the receiver and the transmitter as well as the optical collimating system are pre-mounted on the printed circuit board and since no additional path-folding mirrors are used, it is possible to create a compact, small-sized measuring device.

It is not possible to gather from DE 10 2005 041 998 A1 how the receiver which, together with the transmitter, is disposed on one side of a printed circuit board is protected against scattered radiation, nor is there any mention as to which measures are taken to ensure thermal stability. The mechanical stability is implemented by way of the optical system carrier which essentially has a platelike shape and which, along its oppositely lying long sides, has reinforcing ribs between which the fasteners for the printed circuit board are disposed.

DE 103 31 074 A1 discloses a sensor assembly for measuring distances which is disposed behind the windowpane in the passenger cabin of an automotive vehicle. Given its use, it is obvious that it is designed to measure only short distances. The sensor assembly is contained in a housing which is sealed shut by the windowpane to which it is attached. The transmitter assembly comprises a transmitter channel and a receiver channel, one being disposed on one side and the other being disposed on the opposite side of a printed circuit board that is opaque to the radiation of the transmitter. As to how the individual components of the two channels are mounted, it is possible to gather from the drawings only that the transmitter, for example, a laser diode, is mounted directly on the printed circuit board and that the lens assembly of the receiver unit is inserted into the housing. The housing serves as the component that gives the transmitter assembly its mechanical stability.

OBJECTS OF THE PRESENT INVENTION

The problem to be solved by the present invention is to make available an even smaller and more compact laser distance measuring device which has a high mechanical and thermal stability so that it is especially well suited for measuring large distances and can be inserted as a module into complex apparatuses.

For a laser distance measuring device comprising a transmitter channel and a receiver channel, wherein said transmitter channel comprises a laser transmitter and an optical transmission system which together define a transmission axis, and said receiver channel comprises a receiver and an optical reception system which together define a reception axis, wherein said reception axis is aligned parallel to the transmission axis, and a printed circuit board which is opaque to the radiation of the laser transmitter, and upon which the laser transmitter and the receiver are mounted, wherein the laser transmitter and the optical transmission system are disposed on one surface of the printed circuit board, and the receiver and the optical reception system are disposed upon the opposite side, wherein the printed circuit board is a dimensionally stable multilayer base printed circuit board, the problem of the present invention is solved in that the printed circuit board is a dimensionally stable multilayer base printed circuit board which gives the laser distance measuring device its mechanical stability and on which all components of the laser distance measuring device are mounted.

The base printed circuit board is not only, as usual, the mounting base for electronic and electro-optical components that can be connected to one another by way of integrated conductor tracks; it also serves as the mechanical foundation that gives the laser distance measuring device its stability and on which all components of the laser distance measuring device, including the optical components such as the optical transmission system and the optical reception system, are mounted.

The base printed circuit board is dimensionally stable, i.e., potential dimensional variations, e.g., caused by warping or buckling, are so minimal that the position of the transmission axis and the reception axis relative to each other remains within tolerance.

In addition to the electrical and the mechanical function, the base printed circuit board also has an optical function. Disposed between the laser transmitter and the receiver, the base printed circuit board, since it is opaque to the radiation of the laser transmitter, blocks direct or indirect radiation of the laser transmitter. Therefore, it is not necessary to take usually required additional measures for shielding the receiver.

Using the design of the base printed circuit board described above makes it possible to create a mechanically stable and compact laser distance measuring device.

The laser distance measuring device can be inserted into a housing which thereafter has only a protective function.

The base printed circuit board preferably has mounting holes so as to make it possible to insert the laser distance measuring device as a module into a complex apparatus and to secure it in place.

In a useful embodiment of a laser distance measuring device, the base printed circuit board has solder points for attaching the laser transmitter and the receiver, the size of said solder points being larger than the alignment area necessary to align the laser transmitter and the receiver, and wherein the laser transmitter and the receiver are each indirectly connected to the solder points by way of an adjoined printed circuit board.

To ensure that the transmission axis and the reception axis run parallel to each other, the laser transmitter, the optical transmission system, the receiver and the optical reception system must be disposed in a predetermined position and alignment relative to one another. To this end, the optical transmission system and the optical reception system are preferably attached to the base printed circuit board by means of an adhesive connection, and the laser transmitter and the receiver, respectively, are positioned and aligned in such a manner that their centers in the focal plane of the optical transmission system or the optical reception system and the nodal points of the optical transmission system or the optical reception system are located on two parallel straight lines which define the transmission axis and the reception axis.

To be able to position and align the laser transmitter and the receiver, it must be possible to move the adjoined printed circuit boards, each of which is fitted, respectively, with the laser transmitter and the receiver, within a predetermined alignment area, which is determined by the positional tolerance of the optical transmission system and the optical reception system, in the direction of all three spatial axes, i.e., the x-, y- and z-axes, to the optical transmission system and the optical reception system.

To allow the aligned adjoined printed circuit boards, and thus the aligned laser transmitter and the aligned receiver, to be secured in place in its alignment position, the base printed circuit board has solder points which, in the x- and y-direction, have a size in terms of surface area on the base printed circuit board so that, when in the alignment position, the two adjoined printed circuit boards, on which the laser transmitter and the receiver are mounted, are located directly on top of the solder point.

The adjoined printed circuit boards can subsequently be secured in place in the alignment position by connecting the adjoined printed circuit boards with the solder points by means of solder, with the possibility of mechanically securely soldering the adjoined printed circuit boards even at a distance from the solder points in the z-direction, provided that a sufficiently large amount of solder is used. Since the laser transmitter and the receiver are not directly soldered onto the base printed circuit board, the thermal stress they are subjected to is lower. The laser transmitter and the receiver are preferably mounted on the adjoined printed circuit boards in such a manner that they transmit and receive radiation perpendicular to the respective adjoined printed circuit board so that the adjoined printed circuit boards in turn are preferably positioned perpendicular to the base printed circuit board. The space needed on the base printed circuit board is therefore limited solely to the space for the solder points, via which the adjourned printed circuit board and the base printed circuit board are connected.

In addition, the components directly necessary to operate the laser transmitter and the receiver, such as control elements or an amplifier stage, are preferably also mounted on the adjoined printed circuit boards.

The laser transmitter and the receiver, the optical transmission system and the optical reception system and, optionally, other components are preferably disposed in a mirror-symmetrical position relative to the base printed circuit board so as to subject the base printed circuit board on both sides uniformly to mechanical and thermal stress. This has the effect that the two sides of the base printed circuit board are prevented from heating up to different temperatures, and thus from being distorted, as a result of the local temperature rise due to the heat dissipation of electrical or electro-optical components and as a result of the temperature increase of the optical components due to exposure to heat radiation.

The base printed circuit board preferably comprises a plurality of alternating electrically nonconductive and electrically conductive layers, with at least one of the electrically conductive layers being a full-surface inner copper layer which serves as an optical and electrical shielding layer between the components that are disposed on opposite sides of the base printed circuit board.

The material excellently suited for use as the electrically nonconductive layers was found to be fiberglass-reinforced epoxy resin. Using this material, it is possible to inexpensively produce printed circuit boards that have an especially high stability.

In addition to the electrical conductor tracks by means of which the electrical and electro-optical components are connected to one another or to an interface for their intended use, the printed circuit board can also comprise optical conductor tracks. In this case, the laser transmitter and the receiver could be physically mounted anywhere on or even in the base printed circuit board, and only a beam-emergence opening, downstream in the beam direction, or a beam-entrance opening, upstream in the beam direction, of optical conductor tracks connected with the laser transmitter or the receiver are disposed in the focal plane of the optical transmission system or in the focal plane of the optical reception system, respectively. Since as far as the function of a laser distance measuring device is concerned, it does not matter whether the laser transmitter and the receiver as such are physically located in the focal plane of the optical transmitter and the optical receiver system or in a plane conjugate thereto, the two embodiments are technically equivalent. The advantage of such an embodiment is that the two adjoined printed circuit boards can be reduced in size.

To discharge heat resulting from heat dissipation, free surface areas, on which no components are mounted, are coated with an outer copper layer which acts as a heat sink and which is connected with the inner copper layer.

The printed circuit board can preferably also comprise optical conductor tracks. Thus, the laser transmitter and the receiver can be physically mounted anywhere on or in the base printed circuit board, and instead of the laser transmitter, a beam-emergence opening, downstream in the beam direction, of an optical conductor track connected with the laser transmitter is disposed in the focal plane of the optical transmission system. And instead of the receiver, a beam-entrance opening, upstream in the beam direction, of an optical conductor track connected with the receiver is disposed in the focal plane of the optical reception system. From an optical standpoint, the two solutions are equivalent.

The heat that is emitted from the components to the base printed circuit board is transferred via the full-surface inner copper layer to the heat sink, from which it is dissipated.

The base printed surface board preferably comprises plug-in connectors, by means of which the laser distance measuring device can be connected to a computer and a power supply unit.

SUMMARY OF THE INVENTION

Especially in the interest of weight reduction, the optical transmission system and the optical reception system preferably are made of a transparent polymer, e.g., acrylic. On the peripheral area of each system, there is a planar phase, by means of which it is glued to the base printed circuit board. As a result, the distance between the transmission axis and the reception axis can be shortened when compared to conventionally designed optical systems.

BRIEF DESCRIPTION OF THE DRAWINGS

The invention will be explained in greater detail below based on a practical example. Thus:

FIG. 1 shows a schematic diagram of a laser distance measuring device.

DESCRIPTION OF THE EMBODIMENTS

The laser distance measuring device, the most important features of which are shown in FIG. 1, comprises a multilayer base printed circuit board 3 which serves as the mechanical foundation, as an optical and electrical shield, as a carrier of electrical connections and as a heat conductor. Because of this multifunctional design of the base printed circuit board 3, it is possible to inexpensively produce a comparatively small, lightweight, compact and stable laser distance measuring device.

To the extent possible, the components necessary for the laser distance measuring device are disposed symmetrically with respect to each other on the two surfaces of the base printed circuit board 3. The necessary components are a laser transmitter 1.1, e.g., a laser diode, and an optical transmission system 1.2, the two being disposed on one surface of the base printed circuit board and forming the transmitter channel 1 with a transmission axis 1.3, and a receiver 2.1, e.g., a photodiode, and an optical reception system 2.2, the two being disposed on the opposite side of the base printed circuit board 3 and forming the receiver channel 2 with a reception axis 2.3.

To the extent possible with mechanical aids, the optical transmission system 1.2 and the optical reception system 2.2 are glued onto the base printed circuit board 3 in a plane or, rather, in planes parallel to each other.

The laser transmitter 1.1 is mounted on a so-called adjoined printed circuit board 5, preferably jointly with a control element necessary therefor. The receiver 2.1 is preferably mounted jointly with an amplifier stage connected thereto on a second adjoined printed circuit board 5.

The terms "base printed circuit board" and "adjoined printed circuit board" are used to distinguish between the printed circuit boards. The adjoined printed circuit boards are printed circuit boards which are adjoined to the base printed circuit board, regardless of where or by means of which type of connection they are connected to the base printed circuit board.

On the adjoined printed circuit boards 5, all of the electrical contacts are located on an end face. Via this end face, the adjoined printed circuit boards 5 are soldered with tin solder to the base printed circuit board 3 by way of the solder points 4 disposed thereon.

Prior to soldering the adjoined printed circuit boards 5 [to the base printed circuit board], they are aligned relative to the optical transmission system 1.2 and to the optical reception system 2.2, respectively, to ensure that the transmission axis 1.3 and the reception axis 2.3 are aligned parallel to each other.

Other components of the laser distance measuring device, e.g., a time measuring circuit and control units, are distributed on both sides of the base printed circuit board 3 in such a manner that the heat input into the base printed circuit board 3 is distributed as uniformly as possible. The objective is to avoid a different degree of expansion of the material on the oppositely lying sides of the base printed circuit board 3 and thus distortion of the base printed circuit board 3. A distortion of the base printed circuit board 3 would immediately cause the transmission axis 1.3 and the reception axis 2.3 to tilt relative to each other, which could render the laser distance measuring device useless.

All components are stably attached either via an adhesive joint or a soldered joint. The base printed circuit board 3 is a multilayer printed circuit board made of materials conventionally used for this purpose. Between individual electrically nonconductive layers, in this case made of fiber-reinforced epoxy resin, electrically conductive layers formed by conductor tracks and a full-surface inner copper layer 3.1 are inserted. The copper layer 3.1 serves as an optical and electrical shield between the components that are disposed on both sides of the base printed circuit board 3 as well as a heat conductor.

The heat generated by the individual electrical and electro-optical components due to heat dissipation as well as the heat resulting from absorption into the optical components is transferred mainly into the base printed circuit board 3 where it is conducted to heat sinks 6 by means of the full-surface inner copper layer 3.1. The heat sinks 6 are regions that are coated with a thick copper layer and that are located on the uncovered areas of the surface of the base printed circuit board 3. The position of the components, and thus of the covered regions, are predetermined by their functions and the necessary distances from one another. However, especially in the region of the transmitter channel 1 and receiver channel 2 where no other components can be disposed, there are large areas which, after coating with the copper layer, can serve as heat sinks.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS

1 Transmitter channel
1.1 Laser transmitter
1.2 Optical transmission system
1.3 Transmission axis
2 Receiver channel
2.1 Receiver
2.2 Optical reception system
2.3 Reception axis
3 Base printed circuit board
3.1 Full-surface inner copper layer
4 Solder point
5 Adjoined printed circuit board
6 Heat sink

What is claimed is:

1. A laser distance measuring device comprising:
a transmitter channel and a receiver channel, wherein said transmitter channel comprises a laser transmitter and an optical transmission system which together define a transmission axis, and said receiver channel comprises a receiver and an optical reception system which together define a reception axis, wherein said reception axis is aligned parallel to the transmission axis, and
a printed circuit board which is opaque to the radiation of the laser transmitter, and upon which the laser transmitter and the receiver are mounted, wherein the laser transmitter and the optical transmission system are disposed on one surface of the printed circuit board, and the receiver and the optical reception system are disposed upon a surface of the printed circuit board on an opposite side of said one surface,
wherein the printed circuit board is a dimensionally stable multilayer base printed circuit board, said base printed circuit board having solder points for attaching the laser transmitter and the receiver, the size of said solder points being larger than the alignment area necessary to align the laser transmitter and the receiver, and the laser transmitter and the receiver each being indirectly connected to the solder points by way of an adjoined printed circuit board, while each of the adjoined printed circuit boards is fitted, respectively, with the laser transmitter and the receiver and the laser transmitter is mounted on an adjoined printed circuit board and the receiver is mounted on a second adjoined printed circuit board, said transmission axis and said reception axis being oriented perpendicular to a main plane of said adjoined printed circuit board, said adjoined printed circuit board being oriented perpendicular to the base printed circuit board, and the adjoined printed circuit board and the base printed circuit board being connected via the solder points and wherein the base circuit board comprises a plurality of alternating electrically nonconductive and electrically conductive layers, with at least one of the electrically conductive layers being a full-surface inner copper layer which serves as optical and electrical shielding layer, wherein the surfaces of the base printed circuit board comprise at least one free area wherein said free area is coated with a copper layer which acts as a heat sink and which is connected with the inner full-surface copper layer, and wherein the optical transmission system and the optical reception system have a planar phase along their circumference, for connecting the optical transmission system and the optical reception system to the base printed circuit board.

2. The laser distance measuring device of claim 1, wherein the laser transmitter and the receiver, the optical transmission system and the optical reception system and, optionally, additional components, are disposed in a mirror-symmetrical position relative to the base printed circuit board so as to subject both sides of the base printed circuit board uniformly to mechanical and thermal stress.

3. The laser distance measuring device of claim 1, wherein the electrically nonconductive layers are made of a fiberglass-reinforced epoxy resin.

4. The laser distance measuring device of claim 1, wherein the base printed circuit board comprises at least one optical conductor track, and wherein the laser transmitter and the receiver are physically mounted anywhere on or in the base printed circuit board,
  wherein a beam-emergence opening, downstream in the beam direction, of an optical conductor track connected with the laser transmitter is disposed in the focal plane of the optical transmission system, and a beam-entrance opening, upstream in the beam direction, of an optical conductor track connected with the receiver is disposed in the focal plane of the optical reception system.

5. The laser distance measuring device of claim 1, wherein the base printed circuit board comprises at least one plug-in connector, for connecting the laser distance measuring device to an external unit.

6. The laser distance measuring device of claim 1, wherein the optical transmission system and the optical reception system are made of a transparent polymer.

* * * * *